United States Patent
Cam Winget et al.

(10) Patent No.: US 7,817,042 B2
(45) Date of Patent: Oct. 19, 2010

(54) RFID TAG MANAGEMENT AND OPERATION

(75) Inventors: Nancy Cam Winget, Mountain View, CA (US); Allan Thomson, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 385 days.

(21) Appl. No.: 11/678,286

(22) Filed: Feb. 23, 2007

(65) Prior Publication Data

US 2008/0204248 A1 Aug. 28, 2008

(51) Int. Cl.
G08B 13/14 (2006.01)
(52) U.S. Cl. ............... 340/572.4; 340/286.02
(58) Field of Classification Search ............ 340/572.4
See application file for complete search history.

(56) References Cited

U.S. PATENT DOCUMENTS

| | | | | |
|---|---|---|---|---|
| 5,767,791 | A * | 6/1998 | Stoop et al. | 340/870.11 |
| 6,707,915 | B1 * | 3/2004 | Jobst et al. | 380/247 |
| 6,980,087 | B2 * | 12/2005 | Zukowski | 340/10.51 |
| 7,032,242 | B1 * | 4/2006 | Grabelsky et al. | 726/11 |
| 7,161,934 | B2 * | 1/2007 | Buchsbaum et al. | 370/382 |
| 2004/0204038 | A1 * | 10/2004 | Suzuki et al. | 455/553.1 |
| 2005/0030160 | A1 | 2/2005 | Goren et al. | |
| 2005/0141465 | A1 * | 6/2005 | Kato et al. | 370/337 |
| 2005/0207381 | A1 | 9/2005 | Aljadeff et al. | |
| 2006/0002383 | A1 * | 1/2006 | Jeong et al. | 370/360 |
| 2006/0093135 | A1 * | 5/2006 | Fiatal et al. | 380/28 |
| 2006/0190654 | A1 * | 8/2006 | Joy et al. | 710/305 |
| 2006/0267936 | A1 | 11/2006 | Hoerl et al. | |
| 2007/0026818 | A1 * | 2/2007 | Willins et al. | 455/91 |
| 2007/0046460 | A1 * | 3/2007 | Aljadeff et al. | 340/539.13 |
| 2007/0156858 | A1 * | 7/2007 | Sood et al. | 709/220 |
| 2007/0162958 | A1 * | 7/2007 | Kao et al. | 726/4 |
| 2008/0049703 | A1 * | 2/2008 | Kneckt et al. | 370/342 |

FOREIGN PATENT DOCUMENTS

| | | |
|---|---|---|
| EP | 1 755 091 | 2/2007 |
| WO | WO 2006/087716 | 8/2006 |
| WO | WO 2007/064747 | 6/2007 |

OTHER PUBLICATIONS

PCT International Search report, International Application No. PCT/US2008/053558, Jul. 18, 2008.

\* cited by examiner

*Primary Examiner*—George A Bugg
*Assistant Examiner*—Naomi Small
(74) *Attorney, Agent, or Firm*—Tucker Ellis & West LLP

(57) ABSTRACT

In an example embodiment, an apparatus such as an RFID tag, is configured to operate in a first mode that allows the tag to associate with the network and receive configuration data and to operate in a second mode wherein the apparatus is not associated with the network. The apparatus sends announcement packets while in the second mode in accordance with the configuration data received while in the first mode of operation.

21 Claims, 4 Drawing Sheets

RFID TAG MANAGEMENT AND OPERATION

BACKGROUND

Active RFID (radio frequency identification) tags, such as WiFi RFID tags, are employed in many applications. For example RFID tags can be used for asset tracking or location determination. For example, in a hospital RFID tags can be used to enable medical personnel to locate equipment such as heart monitors or defibrillators.

Some RFID tags announce their presence periodically by sending a multicast packet, such as a layer 2 802.11 multicast packet, to a network without associating to an access point (AP). The AP is setup to allow packets to the known multicast address to be forwarded to a controller or other device on the network. Because these tags do not associate with the WLAN (wireless local area network) at all, all configuration or management of the tag is performed using an out-of-band mechanism, such as a CLI (command line interface) that uses a separate serial interface.

Some RFID tags associate to the WLAN, allowing them to be managed effectively over the air. However, these tags remain associated to the WLAN and do not revert to an unassociated mode of operation. This has a significant impact on the tags battery life as well as on the resources of the wireless controller and/or AP of the WLAN, and does not enjoy the advantages of an unassociated tag.

OVERVIEW OF EXAMPLE EMBODIMENTS

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In an example embodiment, there is described herein an apparatus such as an RFID tag, is configured to operate in a first mode that allows the tag to associate with the network and receive configuration data and to operate in a second mode wherein the apparatus is not associated with the network. The tag can send the application request while in either the associated or unassociated state. As used herein, in the associated state the tag communicates bi-directionally with the WLAN infrastructure (that is it sends and also receives communications from the network), whereas in the unassociated state the tag merely communicates unidirectionally (the tag sends packets to the WLAN infrastructure but does not receive packets). The apparatus sends announcement packets while in the second mode in accordance with the configuration data received while in the first mode of operation.

Optionally, the tag may also operate in a third state of operation that allows a tag to send an "application" announcement for acknowledgement by the network infrastructure. The application announcement may be sent by the tag either in the associated state or the unassociated state. However, the tag receives the acknowledgement from the network infrastructure while in the associated state. Thus, if the tag sends an application announcement while in the unassociated state, the network infrastructure sends the acknowledgement the next time the tag is in the associated state.

In an example embodiment, there is described herein a method. The method comprises associating with a network. The method further comprises receiving configuration data while associated with the network. The method also comprises disassociating from the network and transmitting an announcement packet periodically in accordance with the configuration data after disassociating with the network.

Still other objects of the present invention will become readily apparent to those skilled in this art from the following description wherein there is shown and described a preferred embodiment of this invention, simply by way of illustration of at least one of the best modes best suited to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrates examples of the present invention, and together with the description serve to explain the principles of the invention.

DESCRIPTION OF EXAMPLE EMBODIMENTS

Figure 1:
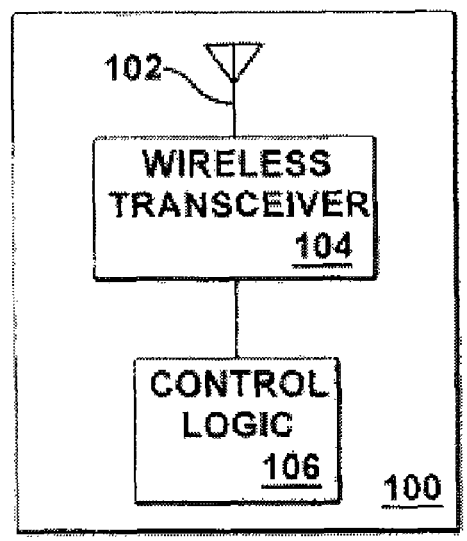
FIG. 1 is a block diagram of an apparatus in accordance with an example embodiment.

This description provides examples not intended to limit the scope of the invention, as claimed. The figures generally indicate the features of the examples, where it is understood and appreciated that like reference numerals are used to refer to like elements.

In an example embodiment, described herein is a system that provides an integrated approach to managing RFID tags. The tag has two states of operation, an associated state whereby the tag can be configured and an unassociated state whereby the tag sends announcement messages as specified by the configuration received during the associated state.

The associated state has two modes of operation. The first mode, the initial (or bootstrap) mode enables the tag to receive an initial configuration. The second mode, an ongoing management mode, allows the tag to be reconfigured or to provide the WLAN infrastructure with tag information.

In an example embodiment, the tag has non-volatile and volatile memory. When the tag is manufactured, the tag will be configured with a "Manufacturing" Public/Private key that is stored in the non-volatile memory. After manufacturing, the tag is inactive until activated by a chokepoint or any other suitable means (e.g. a switch, a predefined signal, etc.). When activated, the tag will attempt to associate to any local APs that respond to a probe request sent by the tag. In an example embodiment, the tag uses its manufacturing key as part of the authentication with the AP (e.g. an 802.11i or 802.11i compatible authentication). Once authenticated and associated, the network will be able to send a Config Request (or other suitable) message to configure the tag. The tag can be configured with setup parameters such as operating frequencies and blink rate interval (e.g. the rate or time period for sending announce packets). While in the associated state, the tag's image can be upgraded. Furthermore, the network AP can send a request asking for the tag to send data, such as its image version, identification and current configuration. In an example embodiment, the tag will be configured with security credentials, such as an administrative public key/private key.

Once configured, the tag reverts into an unassociated state. While in the unassociated state, the tag sends announcement frames at a configured rate on a configured set of channels. The network can free all resources that were allocated while the tag was associated with the tag while the tag is in the unassociated state.

In an example embodiment, the tag periodically changes from the unassociated state to the associated state, allowing for ongoing management of the tag. The tag can periodically change from the unassociated state to the associated state based on any criteria. For example, the tag can be configured to automatically attempt to associate with the network after a predetermined time period, such as once a day, or after a predetermined number of packets are sent. As another example, the tag can wait for a beacon or message from the network after a predetermined interval (e.g. after a predefined number of packets have been sent, or after a time period such as once an hour or once a day). During the associated state, the tag can be re-configured, e.g. the tag's blink rate interval can be changed, the tag can receive new security credentials, and/or the tag's image can be updated or a new image can be downloaded. Additionally, while in the associated state the tag can send information to the network, such as historical data or telemetry data. The tag then reverts to the unassociated state. It should be noted that the tag can send information to the WLAN infrastructure such as historical data and/or telemetry data while either in the associated or unassociated state.

Optionally, in an example embodiment, the tag may also operate in a third state of operation that allows a tag to send an "application" announcement for acknowledgement by the network infrastructure. The application announcement may be sent by the tag either in the associated state or the unassociated state. However, the tag receives the acknowledgement from the network infrastructure while in the associated state. Thus, if the tag sends an application announcement while in the unassociated state, the network infrastructure sends the acknowledgement the next time the tag is in the associated state.

In an example embodiment, the tag is configured with security credentials. For example, when the tag is configured at the factory it receives a manufacturing security credentials (e.g. factory public key/private key). When the tag is in the associated state it is configured with administration security credentials (e.g. administration public key/private key—keys that are locally significant to a customer deployment). Once the tag is configured with administration security credentials, the tag uses the administration security credentials. If the tag is reset to factory defaults, the factory security credentials are restored.

By using different security credentials for factory and administration, this allows tags built by the same manufacturer to be utilized by different end users. For example, a manufacturer can make two tags, e.g. Tag 1, Tag2 with the same manufacturer security credentials. Tag 1 is sold to a first company (e.g. Fedex) and Tag 2 is sold to a second company (e.g. UPS). When tag 1 arrives at the first company, the first company configures the tag with its administrative security credentials. When tag 2 is sold to the second company, the second company configures Tag 2 with its administrative security credentials. Thus, even if both tags are deployed into a worldwide distribution chain (e.g. Fedex & UPS), only the appropriate network (e.g. Fedex for Tag 1 and UPS for Tag 2) will accept the data from the appropriate tag. For example, the UPS tag will not be accepted by the Fedex network and the Fedex tag will not be accepted by the UPS network.

Another aspect of using administration security credentials is that it ensures that the tag is authenticated (e.g. the tag can use a combination of payload+signature+MIC "Message Integrity Check"). Still another aspect of using security credentials is that the tag can send secure packets.

Referring to FIG. 1, there is an RFID tag 100 in accordance with an example embodiment. RFID tag 100 comprises an antenna 102 coupled to a wireless transceiver 104. A control logic 106 with logic for controlling the operation of wireless transceiver 104 is operably coupled to wireless transceiver 104. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

In an example embodiment, tag 100 has two states of operation, an associated state whereby the tag can be configured and an unassociated state whereby the tag sends announcement messages as specified by the configuration received during the associated state.

The associated state has two modes of operation. The first mode, the initial (or bootstrap) mode enables the tag to receive an initial configuration. The second mode, an on-going management mode, allows the tag to be reconfigured or to provide the WLAN with tag information.

Figure 2:
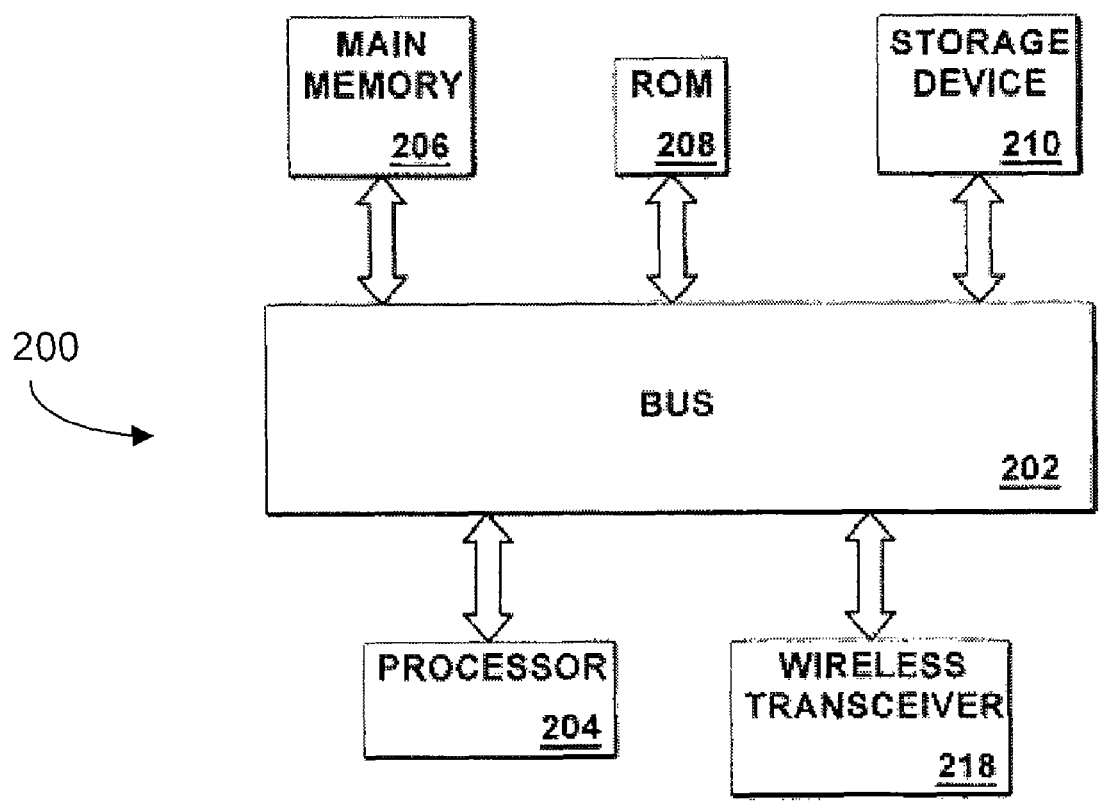
FIG. 2 is a block diagram of a computer system for implementing an example embodiment.

In an example embodiment, tag 100 has non-volatile and volatile memory (not shown, see e.g. FIG. 2). When tag 100 is manufactured, tag 100 is configured with a "Manufacturing" Public/Private key that is stored in the non-volatile memory. Initially, tag 100 is inactive until activated by a chokepoint or any other suitable means (e.g. a switch, a predefined signal, etc.). When activated, control logic 106 tag attempts to associate to any local APs that respond to a probe request. In an example embodiment, tag 100 uses its manufacturing key as part of the authentication with the AP (e.g. an 802.11i or 802.11i compatible authentication). Once authenticated and associated, the network will be able to send a Config Request (or other suitable) message to configure tag 100. Tag 100 can be configured with setup parameters such as operating frequencies and blink interval rate. While in the associated state, an image for control logic 106 can be downloaded or upgraded. Furthermore, tag 100 can send data to an AP, such as its image version, identification and current configuration version. In an example embodiment, tag 100 is configured with security credentials, such as an administrative public key/private key.

Once configured, tag 100 reverts into an unassociated state. While in the unassociated state, tag 100 sends via wireless transceiver 104 announcement messages at the configured rate and on a channel set during configuration. The network can free all resources associated with the tag while the tag is in the unassociated state.

In an example embodiment, tag 100 periodically changes from the unassociated state to the associated state, allowing for ongoing management of the tag. Tag 100 can periodically change from the unassociated state to the associated state based on any criteria. For example, tag 100 can be configured to automatically attempt to associate with the network after a predetermined time period, such as once a day, or after a predetermined number of packets are sent. As another example, tag 100 can wait for a beacon or message from the network after a predetermined interval (e.g. after a predefined number of packets have been sent, or after a time period such as once an hour or once a day). During the associated state, logic in control logic 106 can be re-configured, e.g. the tag's blink interval rate or operating channel can be changed, the tag can receive new security credentials, and/or the tag's image can be updated or a new image can be downloaded. Additionally, while in the associated state the tag can send information to the network, such as historical data. Tag 100 then reverts to the unassociated state.

In an example embodiment, tag 100 is configured with security credentials. For example, when the tag is configured at the factory it receives a manufacturing security credentials (e.g. factory public key/private key). The manufacturing security credentials would be stored in non-volatile memory associated with control logic 106. When tag 100 is in the associated state it is configured with administration security credentials (e.g. administration public key/private key). In an example embodiment, the administration security credentials are stored in a volatile memory associated with control logic 106. Alternatively, the security credentials can be stored in a non-volatile memory, and the credentials are purged if tag 100 is reset to factory defaults. Once tag 100 is configured with administration security credentials, the tag uses the administration security credentials. If the tag is reset to factory defaults, the factory security credentials are restored.

FIG. 2 is a block diagram that illustrates a computer system 200 upon which an embodiment of the invention may be implemented. Computer system 200 includes a bus 202 or other communication mechanism for communicating information and a processor 204 coupled with bus 202 for processing information. Computer system 200 also includes a main (e.g. volatile) memory 206, such as random access memory (RAM) or other dynamic storage device coupled to bus 202 for storing information and instructions to be executed by processor 204. Main memory 206 also may be used for storing a temporary variable or other intermediate information during execution of instructions to be executed by processor 204. Computer system 200 further includes a read only (e.g. non-volatile) memory (ROM) 208 or other static storage device coupled to bus 202 for storing static information and instructions for processor 204. A storage device 210, such as a magnetic disk or optical disk, is provided and coupled to bus 202 for storing information and instructions.

An aspect of the invention is related to the use of computer system 200 for RFID Tag Management and Operation. According to one embodiment of the invention, RFID Tag Management and Operation is provided by computer system 200 in response to processor 204 executing one or more sequences of one or more instructions contained in main memory 206. Such instructions may be read into main memory 206 from another computer-readable medium, such as storage device 210. Execution of the sequence of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to non-volatile media, volatile media, and transmission media. Non-volatile media include for example optical or magnetic disks, such as storage device 210. Volatile media include dynamic memory such as main memory 206.

Computer system 200 also includes wireless transceiver 218 coupled to bus 202. Wireless transceiver 218 provides a two-way data communication coupling to a network. In any such implementation, communication interface 218 sends and receives electrical, electromagnetic, or optical signals that carry digital data streams representing various types of information. By using wireless transceiver 218, computer system 200 can send messages and receive data, including program codes, through the network(s). For example image data can be downloaded for processor 204 to execute for controlling the operation of wireless transceiver 218. In accordance with an example embodiment, one such downloaded application provides for RFID tag management and operation as described herein.

The received code may be executed by processor 204 as it is received, and/or stored in storage device 210, or other non-volatile storage for later execution. In this manner, computer system 200 may obtain application code in the form of a carrier wave.

Figure 3:
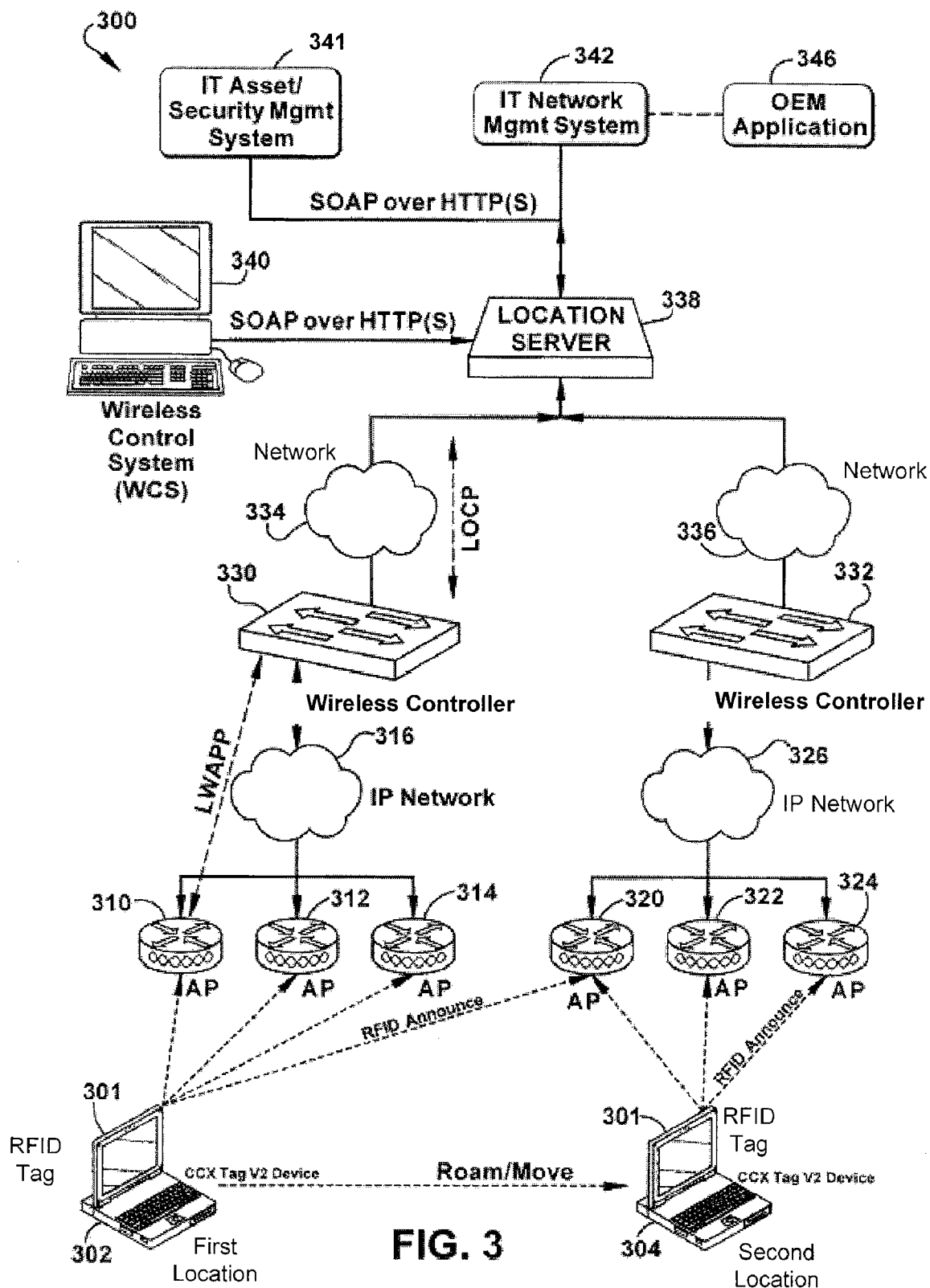
FIG. 3 is a block diagram of a system in accordance with an example embodiment.

FIG. 3 is a block diagram of a system 300 in accordance with an example embodiment. An RFID tag 301 is shown operating at a first location 302. Eventually tag 301 roams or moves to the second location 304. In an example embodiment, RFID tag 301 is configured similar to tag 100 described in FIG. 1 and/or computer system 200 described in FIG. 2. As illustrated, while at location 302, access points (APs) 310, 312, 314 and 320 receive communications from tag 301. While at location 304, APs 320, 322, 324 receive communications from the tag 301. APs 310, 312, 314 are coupled via network (e.g. an IP network) 16 to wireless controller 330. APs 320, 322, 324 are coupled via network (e.g. an IP network) 326 to wireless controller 332. Wireless controller 330 is coupled to a location server 338 via network 334. Wireless controller 332 is coupled to location server 338 via network 336. A wireless control system (WCS) 340 is coupled to location server 338. WCS 340 can be employed to manage the configuration of the tag. IT Asset/Security Management System 341 and IT Network Management system 342 are coupled to location server 338. In an example embodiment, an OEM (Original Equipment Manufacturer) application 346 is coupled to IT Network Management System 342

In operation, tag 301 sends announcement messages directed to a predefined multicast address. APs, 310, 312, 314, 320, 322, 324 are configured to be responsive to receiving messages from tag 301 directed to the predefined multicast address to forward the messages to corresponding controllers (e.g. 330, 332). For example, when tag 301 is at location 302, announce messages sent by tag 301 are received by APs 310, 312, 314 and 320. APs 310, 312, 314 forward announce messages to wireless controller 330. AP 320 forwards announce messages to wireless controller 332. Wireless controllers 330, 332 forward the announce messages to location server 338. Wireless controllers 330, 332 may also store relevant information locally. The announce messages may comprise other data added by either the APs or the wireless controllers such as received signal strength intensity (RSSI), angle of arrival (AOA), time or arrival (TOA), and the address of each AP receiving the signal to enable location server 338 to analyze the announce messages. For example, location server 338 can use the data to determine the present location of tag 301. This data, and/or analysis provided by location server 338, such as location determination, can be forwarded to WCS 340, IT Asset/Security Management System 341, IT Network Management System 342 and/or OEM application 346.

Tag 301 is capable of operating in two states as described herein. The first state, an associated state wherein the tag is associated with one of APs 310, 312, 314, 320, 322, 324. As described herein, while in the associated state tag 301 can be configured. The second state of operation, the unassociated state, the tag sends RFID announcements. The RFID announcements are sent on a channel at a blink rate interval set during the first mode.

While in the unassociated state, essentially, RFID tag 301 transmits announce messages that help indicate its position and optionally any telemetry data it has to the wireless infrastructure. The WLAN Infrastructure will provide the configuration and monitoring capabilities to enable RFID Tag 301 to be tracked and forward it's telemetry to applications that will use the data. RFID tag 301 sends the announcement as a multicast message at the configured interval and channels.

Figure 4:
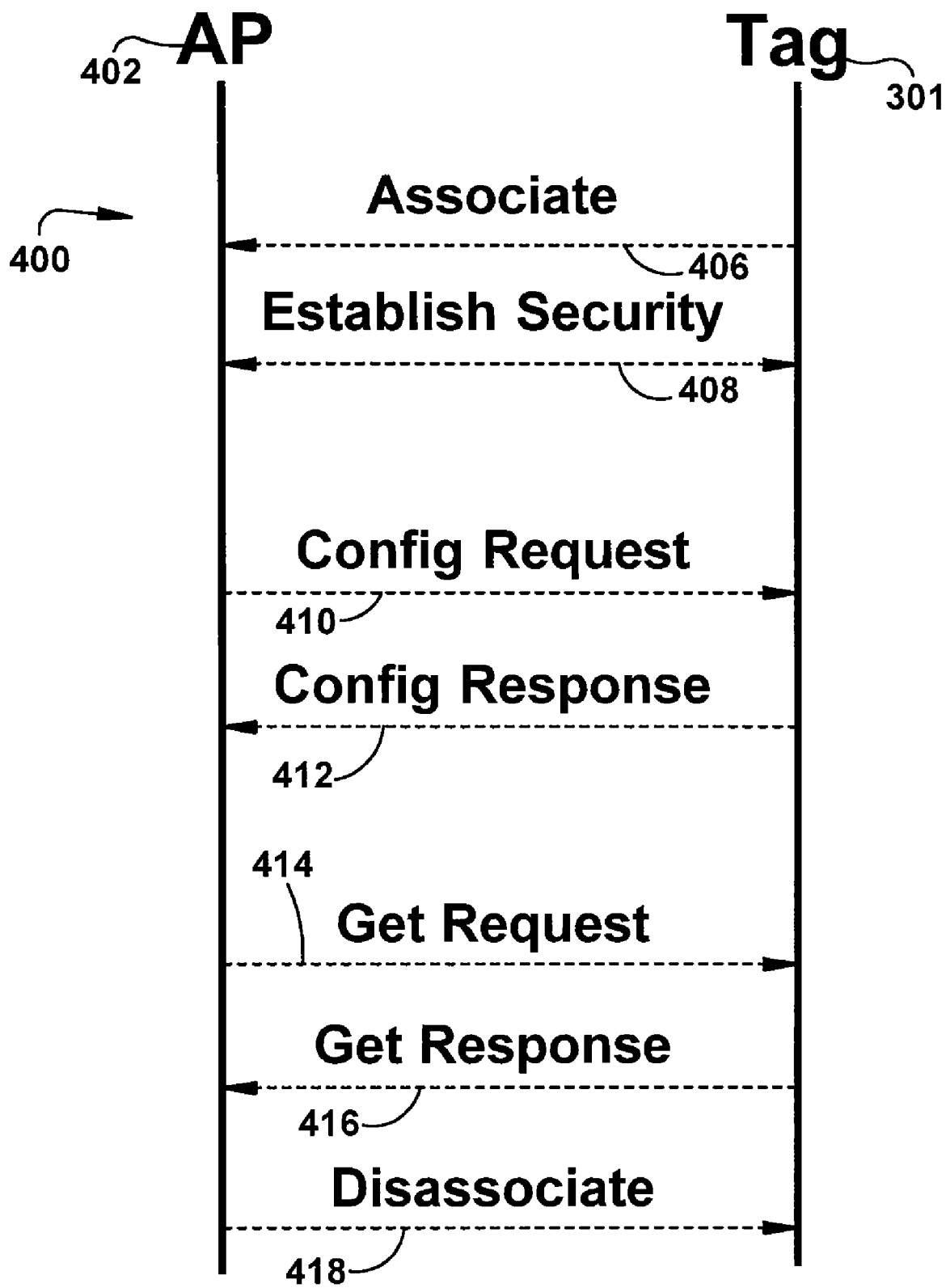
FIG. 4 is a signal diagram for an example embodiment.

FIG. 4 is a signal diagram 400 for switching RFID tag 301 to the associated state which can be used for configuring RFID tag 301 and/or acquiring data from RFID tag 301. AP 402 can be any AP coupled to the network (e.g. any of APs 310, 312, 314, 320, 322, 324). At 402, tag 301 sends a message, such as a probe request, association request, or any suitable message to AP 402. At 408, messages are exchanged between AP 402 and tag 301 to establish security between AP 402 and Tag 301. For example, if tag 301 has not been configured, the messages may include exchanging data to verify that both tag 301 and AP 402 are configured with an appropriate factory security credential. After tag 301 has been configured, tag 301 and AP 402 may exchange data to verify they both are configured with the appropriate administration security credential.

At 410, AP 402 sends a configuration (config) request 410 and at 412 tag 301 sends a configuration response. This enables the network to configure tag 301. Configurable parameters include, but are not limited to, configuration listen interval (how often should the tag associate to the network to check for configuration changes), announcement intervals (how often should tag 301 announce itself), announcement channels (which channels should announcement messages be sent on), transmit power (what power should tag 301 use for transmitting), announcement protection (e.g. setup and establish a protection scheme between the network infrastructure and tag 301), time (determine what time tag 301 has, which can be used for various purposes such as time stamping of reports and telemetry data).

In an example embodiment, AP 402 may request data from the tag 301, such as time data, telemetry data, and historical data. This can be accomplished at 414, where AP 402 sends a Get Request to tag 301 and the tag responds with a Get Response at 416.

At 418, AP 402 sends a disassociate message to tag 301. Tag 301, responsive to the disassociate message, switches to the second (announcement) mode.

RFID tag 301 will usually operate in Announce Mode when it is not associated to any AP. Optionally, an RFID tag may also transmit Announce frames while associated to an AP. Announce messages may be secured after RFID Tag 301 has been configured to do so as part of the Configuration Mode.

RFID tag 301 may switch to the first state, the associated state, whenever it sends a frame to an AP that requires an acknowledgement from the WLAN infrastructure. RFID tag 301 may also switch to the first state based on its configuration, which can be specified as a configuration interval (e.g. to set how often the tag should check for configuration updates).

In an example embodiment, RFID tag 301 is also provided with credentials to ensure secure operation. Secure operation may be desirable to authenticate the tag, to ensure prevent unauthorized devices from configuring the tag, and/or to ensure the privacy of data transmitted from the tag (e.g. to encrypt and protect announcement messages, or messages exchanged during configuration requests/responses or Get requests/responses).

In an example embodiment, RFID 301 tag is initially shipped in a factory default state. It will have a secure identity and credential "burned" in. These are the credentials it can use to identify itself to the RFID system. In an example embodiment, the credentials consist of a public private key pair and certificate. At this point the device does not have a specific configuration or know anything about the specific RFID system it will be used with.

When tag 301 is shipped it is in a state that allows bootstrapping or imprinting. The process of bootstrapping or imprinting brings tag 301 from a factory default state to a secured initialized state. The process of resetting causes tag 301 to go back to factory defaults.

In the initialized state the 301 tag has credentials that it can use to authenticate and authorize other components of the RFID system. It may also obtain a locally significant secure identity and credentials to represent itself to the system. Once tag 301 is initialized it cannot be bootstrapped or imprinted to another system without resetting it to factory default state. Also, once tag 301 is initialized it can then be associated, configured, and registered with the RFID system.

When initialization begins tag 301 is in factory default state. It does not know anything about the system it will associate with. Tag 301 will have an identity and associated credentials provisioned at manufacturing time. In order to initialize tag 301 it is put into initialization mode. Placing the device in initialization mode is equivalent to resetting tag 301 and clearing any existing sensitive data in tag 301. In an example embodiment, placing tag 301 in initialization mode requires physical access to tag 301 and knowledge of the specific procedure for initialization (for example a receiving a specific RF transmission when a switch is engaged).

In configuration mode the device has authenticated and securely associated with the RFID systems 802.11 network. When it is associated it may be configured by authorized components of the system. RFID tag 301 will be configured with a security credential (e.g. key material) that can be used to protect data during Announce mode operation. When the device has the security credential (e.g. key material) for this purpose it is said to be registered. A registered device has an identity and cryptographic credentials that allow it to operate securely in the unassociated state for announcement and application modes.

A secure identity that can be authenticated and used in a key establishment mechanism facilitates providing various security services. In an example embodiment, each tag is provisioned with a secure identity and credentials which can be authenticated by the network infrastructure. The Identity is provisioned at manufacturing time and may be replaced by a locally significant credential at bootstrapping. In order to facilitate privacy support the tag identity can be independent of address identifiers. This allows the identity to be varied independent of address to provide flexibility in designing a privacy solution.

In an example embodiment, the initialization process can perform one or more of the following actions:

1. Imprint the identity and credentials of the system on the tag
2. Register the tag with the system
3. Provision locally significant credentials and identity on the tag
4. Provision service location information on the tag In an example embodiment, the initialization process consists of associating with the RFID system using the EAP-FAST protocol within 802.11. EAP-FAST will run in a mode in which the server presents an X.509 certificate, which the tag 301 will validate, but not verify the chain because it has no trust root. If tag 301 does have an X.509 certificate of its own then it will present this certificate to the EAP-FAST server as part of tunnel establishment. When the EAP server detects that it is an un-registered tag then it will distribute the trusted roots for the RFID system to tag 301 as well as any service location information. The EAP-FAST server may also provision additional identity and credentials to tag 301. Tag 301 will record the credentials and trusted root in its persistent storage and disable initialization mode. In an example embodiment, the steps to initialization mode are as follows
1. Put tag 301 in initialization mode
2. Begin 802.11 association with desired RFID system
3. Start EAP-FAST with server side certificates
4. Tag 301 presents its certificate if it is available
5. System 300 sends trusted roots to tag along with any other service location information
6. Tag 301 saves trusted roots and other information and disables initialization mode
7. System 300 optionally provisions additional credentials and identities in the device
8. Tag 301 saves credentials
9. After saving the credentials, the tag can remain in the associated mode and the remaining configuration tasks can be performed if necessary. In general the initialization process is expected to be carried out in a controlled environment where it can be certain that tag 301 is associating with the correct system.

Before RFID Tag 301 can be used in a secure network it must first be configured with the correct information to participate in the network through the imprinting process. In order to be imprinted tag 301 must first be activated. The activation process can be vendor specific. Once tag 301 is activated it will attempt to associate with network 300. Tag 301 will scan for available SSIDs. Tag 301 should associate with secure networks it sees and attempt to begin an EAP exchange. In example embodiment, tag 301 attempts to negotiate EAP-FAST with the network.

Once both tag 301 and the AP have completed the EAP-FAST exchange the TLS pre-master secret can be used to derive the EAP MSK and EAP EMSK as defined in EAP-FAST. The EAP MSK used to derive the PMK as defined in the 802.11 specification. This is then used in the 802.11i to establish security for is the wireless association. The keys derived for this association through the EAP exchange are only used for this session.

Once tag 301 is associated it may be configured by a device coupled to network 300. In an example embodiment, the following information is configured in tag 301 for security:
Network Trust Root information
Key and key identity for future associations
Keys and key identity for Announce mode
In an example embodiment, there is an integrity key which is 16 bytes and an encryption key which is 16 bytes. The key identity is 10 bytes. The ciphersuite algorithm to be used in Announce mode will also be provisioned.

These keys and credentials may be updated at any time during a secure configuration state.

Entering an association state just involves establishing an 802.11 association. In order to enter association state the tag 301 is initialized. There are several modes of the association state.

Primary association mode uses the lowest level of credential that is provisioned within tag 301. This will typically be a manufacturing configure key pair and certificate. Primary association is typically used when secondary association credentials are not available or secondary association fails. When tag 301 is running in privacy mode the primary tag credentials are not used in establishing the initial EAP-FAST tunnel, but rather are once confidentiality has been established under the systems credentials.

Secondary association mode uses credentials that are provisioned through initialization or another previous association mode. These will typically be symmetric key credentials such as an EAP-FAST PAC. This allows for efficient association. During association mode new secondary credentials may be distributed to tag 301. Since these credentials may be distributed with confidentiality this is a method for providing identity privacy. Tag 301 may also be re-configured during a secondary association (e.g. tag 301 can be provisioned with a new image or new operating frequencies or blink interval rates can be established).

For subsequent associations, tag 301 can use an optimized process based on the identity and key provisioned in the initial association for subsequent configuration sessions. In this case the tag advertises the ID it has as the PMKID in the RSNIE in the associate message. In addition a vendor specific information element is included to indicate that the tag key ID is in the PMKID field. In an example embodiment, If the PMKID is recognized by network 300 then the AP responds by beginning the 4-way handshake.

In an example embodiment, during Announce operation, tag 301 can place the following information into the messages:
the key identity provisioned during configuration mode
a 4-byte timestamp for replay detection. Clocks used for this purpose are synchronized during configuration mode. Time can be represented as UNIX time in the UTC timezone An existing timestamp field should be used.

The information in the tag will be protected with the ciphersuite specified during configuration mode. A ciphersuite may either provide authentication and encryption or just authentication only.

Upon receiving a message the controller (e.g. controller 330 or 332) uses the key ID to obtain the correct key. It will verify the timestamp on the message by checking to see if the message falls outside a clock skew. If it does the controller should flag the message as a potential replay packet. In this case the controller should attempt to get the tag to re-enter config mode as soon as possible. This offers course replay protection. If tighter replay protection is desired then the controller must maintain a replay cache so it can reject replays within the clock skew. The replay cache should be coordinated between controllers in case the tag moves.

In the associated state, the controller (e.g. controller 330 or 332) sends a response that is protected under the same ciphersuite used by tag 301. The controller's response must be bound to the tag's request.

Figure 5:
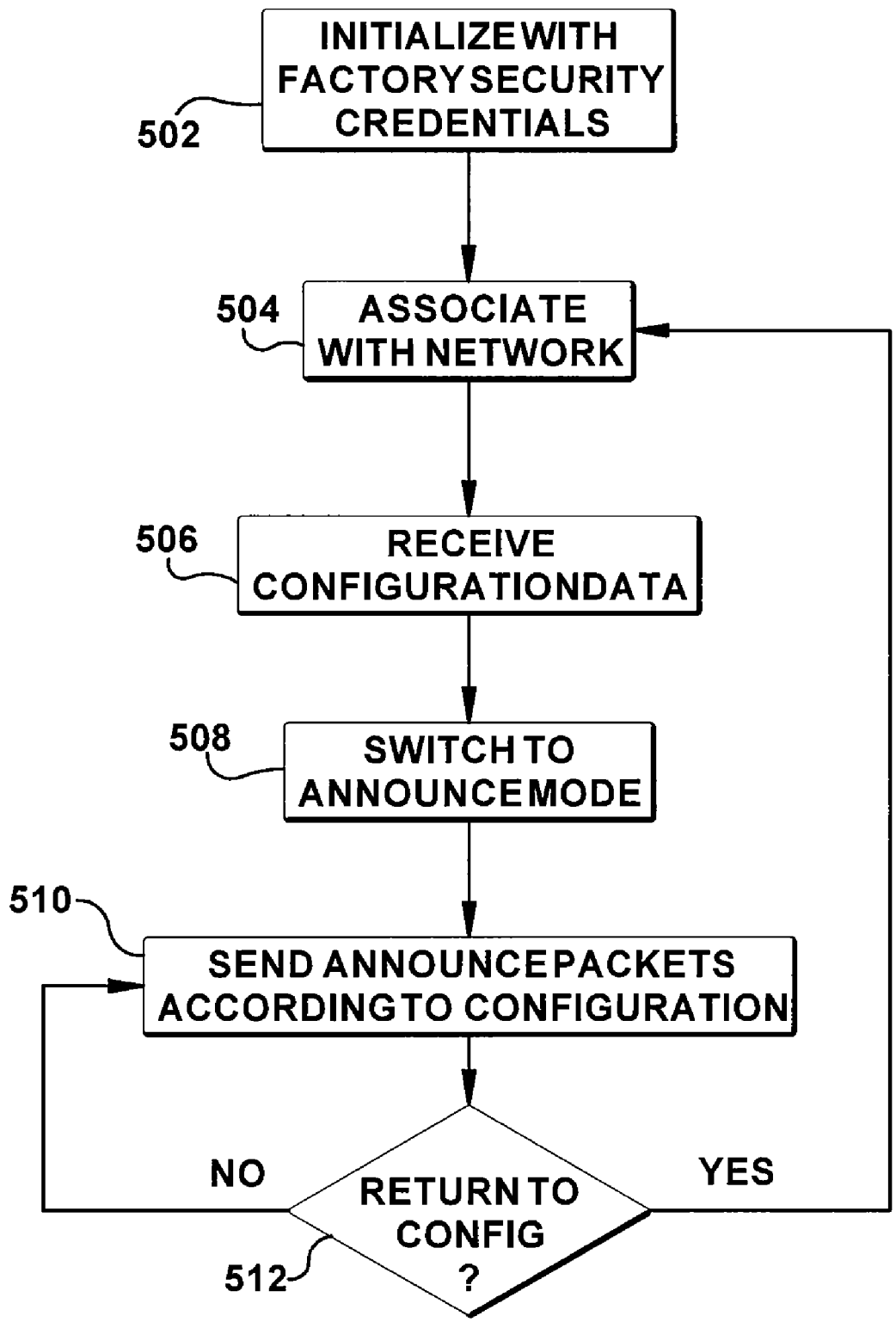
FIG. 5 is a block diagram of a methodology in accordance with an example embodiment.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof.

At 502, a device such as an RFID tag is initialized with factory security credentials. In an example embodiment, the factory security credentials include a public key/private key pair. These credentials are stored in a non-volatile memory. Until the device is configured, the device uses the factory security credentials to communicate.

At 504, the device associates with a network. If the device has not yet been configured, e.g. an initial configuration has not been performed or the only security credentials available are the factory security credentials (which may occur if the device is reset to factory defaults), then the device uses the factory security credentials to associate with the network. If the device has been initialized with security credentials (e.g. administration security credentials such as an administration public key/private key) then the device uses the administration security credentials to associate with the network.

At 506, the device, now in an associated state, receives configuration data. The configuration data can include, but is not limited to configuration listen interval (how often should the tag associate to the network to check for configuration changes), announcement intervals (how often should the tag announce itself), announcement channels (which channels should announcement messages be sent on), transmit power (what power should the tag use for transmitting), announcement protection (e.g. setup and establish a protection scheme between the network infrastructure and the tag), time (determine what time the tag has and/or synchronize the tag's clock, which can be used for various purposes such as time stamping of reports and telemetry data). Optionally, the device's image can be updated.

At 508, the device switches to the unassociated (announce) state. The device is disassociated from the network (which can be initiated by the device or by the network). The network can free all resources associated with the tag while the tag is in the unassociated state.

At 510, the device sends announce packets according to its current configuration. The announcement packets are sent at an interval and channel according to its current configuration. The power level for transmitting the announcement packets may also be configured. In an example embodiment, the announcement packets are signed and/or the data payload is encrypted using administration security credentials provided to the device during configuration.

At 512, the device determines whether it needs to return to the associated state (e.g. configuration mode). If the device is not returning to the associated state (NO), then operation returns to 510 wherein the tag continues to send announce packets as configured. If the device is returning to the associated state, e.g. configuration mode (YES), at 504 the device associates with the network. In an example embodiment, the device will associate using the administration security credential since the device has already been configured. At 504, the device may also provide data to the network, e.g. telemetry data or historical data or any other data the device may be storing. If the device is to be reconfigured, step 506 may also be executed. After the device is completed with its transactions in the associated state, then at 508 the device reverts to the unassociated (announce) state.

What has been described above includes example implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a wireless transceiver;
a memory configured with a factory default setting; and
control logic operable to control the operation of the wireless transceiver;
wherein the control logic is configured to operate the wireless transceiver in a first mode wherein the apparatus communicates bi-directionally while associated with a network to receive data representative of operating parameters, including an administrative security credential, a blink rate interval and at least one operating channel, the operating parameters being for configuring the wireless transceiver for operation in a second mode;
wherein the control logic is responsive to receiving the administration security credential to determine whether the factory default setting is stored in the memory and to selectively store the administration security credential in the memory exclusively when the factory default setting is stored in the memory; and
wherein the control logic is configured to operate the wireless transceiver in the second mode wherein the wireless transceiver communicates uni-directionally using the administrative security credential to send announce packets to a predefined multicast address while not associated to the network.

2. An apparatus according to claim 1, wherein the control logic is configured to receive an image update while in the first mode.

3. An apparatus according to claim 1, wherein the control logic is configured to switch from the second mode to the first mode periodically.

4. An apparatus according to claim 2, wherein the control logic is configured to receive data representative of operating parameters for operating in the second mode after the control logic switches from the second mode to the first mode.

5. An apparatus according to claim 1, further comprising:
a volatile memory; and
a non-volatile memory;
wherein the volatile memory is configured with the factory default security credential.

6. An apparatus according to claim 5, wherein the control logic is responsive to receiving the administration security credential to replace the factory default security credential with the administration security credential in the volatile memory and use the administration security credential for subsequent communications.

7. An apparatus according to claim 6, wherein the control logic is operable to transmit announce messages signed with the administration security credential.

8. An apparatus according to claim 6, wherein the control logic is responsive to receiving data representative of operating parameters to authenticate the data with the administration security credential.

9. An apparatus according to claim 8, the data representative of operating parameters comprises one of a group consisting of a blink rate interval, an operating channel, and an executable image for the controller to utilize.

10. An apparatus according to claim 6, wherein the control logic is configured to switch from the second mode to the first mode periodically and associates with the network using the administration security credential.

11. An apparatus according to claim 10, wherein the control logic is configured to receive data representative of operating parameters for operating in the second mode after the control logic switches from the second mode to the first mode and is responsive to receiving the data to authenticate the data with the administration security credential.

12. An apparatus according to claim 1, the control logic further comprising:
the control logic is configured to operate the wireless transceiver in a third mode wherein the wireless transceiver sends an application packet to the network, while in one of a group consisting of the an associated state and an unassociated state;
wherein the control logic is configured to expect a response from the network to the application packet.

13. A method, comprising:
storing a default setting in a memory;
associating with a network;
communicating bi-directionally with the network to receive configuration data, including an administrative security credential, a blink rate interval and at least one operating channel, while associated with the network;
determining whether the default setting is stored in the memory;
selectively storing the administrative security credential in the memory in accordance with the determining;
disassociating from the network; and
communicating uni-directionally with the network using one of the default setting or the administrative security credential to transmit an announcement packet periodically to a predefined multicast address in accordance with the configuration data after disassociating with the network.

14. A method according to claim 13, further comprising:
periodically re-associating with the network after disassociating with the network; and
receiving updated configuration data while re-associated with the network.

15. A method according to claim 13, further comprising:
receiving a manufacturer security credential;
selectively storing the manufacturer security credential in accordance an operative position of a switch;
wherein the associating step further comprises verifying the network has the manufacturer security credential.

16. A method according to claim 15, further comprising:
receiving an administration security credential; and
wherein the transmitting an announcement packet further comprises authenticating the announcement packet with the administration security credential.

17. An apparatus, comprising:
means for storing a default setting;
means for associating with a network;
means for communicating bi-directionally with the network to receive configuration data, including an administrative security credential, a blink rate interval and at least one operating channel, while associated with the network;
means for selectively storing the administrative security credential in accordance with determining the default setting is in the means for storing;
means for disassociating from the network; and
means for communicating uni-directionally with the network using the administrative security credential to transmit an announcement packet periodically to a predefined multicast address in accordance with the configuration data after disassociating with the network.

18. A system, comprising:
a network;
a server disposed on the network and operable to communicate via the network;
a first access point coupled to the network and operable to communicate with the server via the network;
a second access point coupled to the network and operable to communicate with the server via the network; and
a wireless mobile device;
wherein the wireless mobile device is operable to communicate wirelessly with the first access point while in a first mode, the wireless device while operating in the first mode associates with the first access point and communicates bi-directionally, and while associated with the first access point the wireless mobile device is operable to receive data representative of operating parameters, including a security credential, a blink rate interval and at least one operating channel, for operating in a second mode;
wherein the wireless mobile device is operable to selectively store the security credential for configuring the wireless mobile device for operation in the second mode using the security credential;
wherein the wireless mobile device is further operable to operate in the second mode, wherein while operating in the second mode the wireless mobile device operates uni-directionally with the first and second access points and is operable to send announce packets to a predefined multicast address while not associated to the network; and
the first and second access points are configured to forward packets received from the wireless mobile device that are addressed to the predefined multicast address to the server via the network.

19. The system of claim 18, wherein the first and second access points are operable to send data representative of one of the group consisting of a received signal strength indication (RSSI), angle of arrival (AOA), time of arrival, and the address of the access point receiving the signal with the packets received form the wireless mobile device that are addressed to the predefined multicast address to the server via the network.

20. The system of claim 18, wherein the first time the wireless device associates with the first access point, the wireless device is operable to receive data representative of a trusted root via the first access point.

21. The system of claim 18, wherein while the wireless device is associated with the first access point the wireless device is operable to receive data representative of a cipher-suite algorithm to be used while operating in the second mode via the first access point.

* * * * *